United States Patent
Burd

(10) Patent No.: US 11,492,126 B2
(45) Date of Patent: Nov. 8, 2022

(54) RESTRICTED SPACE AIR CHILLER

(71) Applicant: B/E Aerospace, Inc., Winston-Salem, NC (US)

(72) Inventor: Peter J. L. Burd, Burry Port (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 203 days.

(21) Appl. No.: 16/527,768

(22) Filed: Jul. 31, 2019

(65) Prior Publication Data
US 2021/0031928 A1  Feb. 4, 2021

(51) Int. Cl.
| | |
|---|---|
| *B64D 13/06* | (2006.01) |
| *F25B 21/02* | (2006.01) |
| *F25B 47/02* | (2006.01) |
| *B64D 11/04* | (2006.01) |

(52) U.S. Cl.
CPC .............. *B64D 13/06* (2013.01); *F25B 21/02* (2013.01); *F25B 47/02* (2013.01); *B64D 11/04* (2013.01); *B64D 2013/0629* (2013.01)

(58) Field of Classification Search
CPC  B64D 13/06; B64D 11/04; B64D 2013/0629; F25B 21/02; F25B 47/02
See application file for complete search history.

(56) References Cited

U.S. PATENT DOCUMENTS

| | | | |
|---|---|---|---|
| 5,351,503 A | | 10/1994 | Sugimoto et al. |
| 9,554,491 B1* | | 1/2017 | Wong .................... H05K 7/2079 |
| 9,840,125 B2* | | 12/2017 | Burd ................... B60H 1/00014 |
| 9,919,575 B2* | | 3/2018 | Burd ...................... B64D 13/06 |
| 2005/0210910 A1* | 9/2005 | Rigney ............. B60H 1/00014 62/506 |
| 2009/0107163 A1* | 4/2009 | Lu .......................... F25D 21/14 62/291 |
| 2010/0029190 A1* | 2/2010 | Dessero ................. B64D 11/04 454/76 |
| 2010/0199686 A1* | 8/2010 | Taras ...................... H05B 3/84 62/3.4 |
| 2013/0047657 A1 | 2/2013 | Oswald et al. |
| 2015/0059363 A1* | 3/2015 | Burd ...................... B62B 3/004 62/3.62 |
| 2015/0089968 A1* | 4/2015 | Lu ........................ F25B 25/005 62/244 |
| 2016/0114880 A1* | 4/2016 | Reiss ..................... B64C 11/04 307/10.1 |
| 2017/0276408 A1* | 9/2017 | Khalifa ................... F25B 13/00 |
| 2018/0016018 A1* | 1/2018 | Burd ..................... F25D 17/045 |
| 2018/0201374 A1* | 7/2018 | Trumper ................. F25D 23/12 |

FOREIGN PATENT DOCUMENTS

EP     3323723 B1    10/2020

OTHER PUBLICATIONS

Extended Search Report for European Application No. 19212279 dated Sep. 25, 2020, 10 pages.

* cited by examiner

Primary Examiner — Gordon A Jones
(74) Attorney, Agent, or Firm — Suiter Swantz pc llo

(57) ABSTRACT

An aircraft galley chiller is adapted to fit within a service column of the aircraft. The condenser is elongated, oriented vertically, and includes a bank of fans to increase airflow. The evaporator is also elongated and includes a bank of fans. The evaporator and condenser are oriented with the same plane to produce a footprint that fits within the service column. The evaporator includes a heater element to periodically heat and de-ice the evaporator.

14 Claims, 12 Drawing Sheets

RESTRICTED SPACE AIR CHILLER

BACKGROUND

On commercial passenger aircraft galleys where catering galleys are fitted, preserving perishable food stuffs for the duration of the flight generally requires chiller to be fitted that is capable of circulating a cold airflow around the food storage area. Space and weight are at a premium on aircraft. To maximize the capability of a galley chiller system in a restricted air space, improvements in the airflow and static pressure of both the cooled air re-circulation cycle and/or the liquid recycle and/or the condenser/evaporator re necessary.

SUMMARY

In one aspect, embodiments of the inventive concepts disclosed herein are directed to an aircraft galley air chiller adapted to fit within a service column of the aircraft. The condenser is elongated, oriented vertically, and includes a bank of fans to increase airflow. The evaporator is also elongated and includes a bank of fans. The evaporator and condenser are oriented with the same plane to produce a footprint that fits within the service column.

In a further aspect, the evaporator includes a heater element to periodically heat and de-ice the evaporator.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1A:
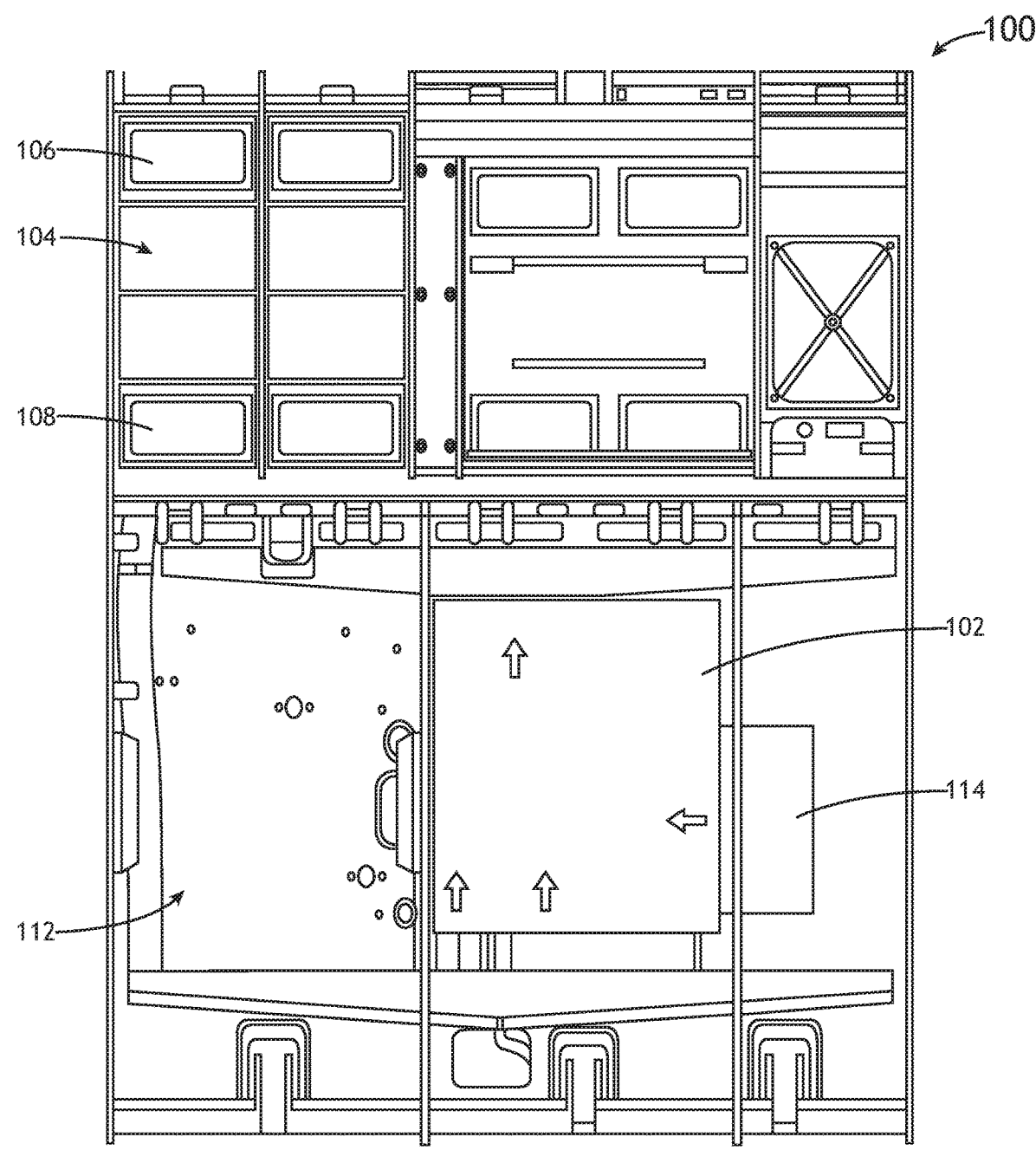
FIG. 1A shows an environmental view of an exemplary embodiment of an air chiller.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft galley air chiller with elongated condenser and evaporator, each having a bank of fans oriented within the same plane to produce a footprint adapted to fit within a service column of the aircraft.

Figure 1B:
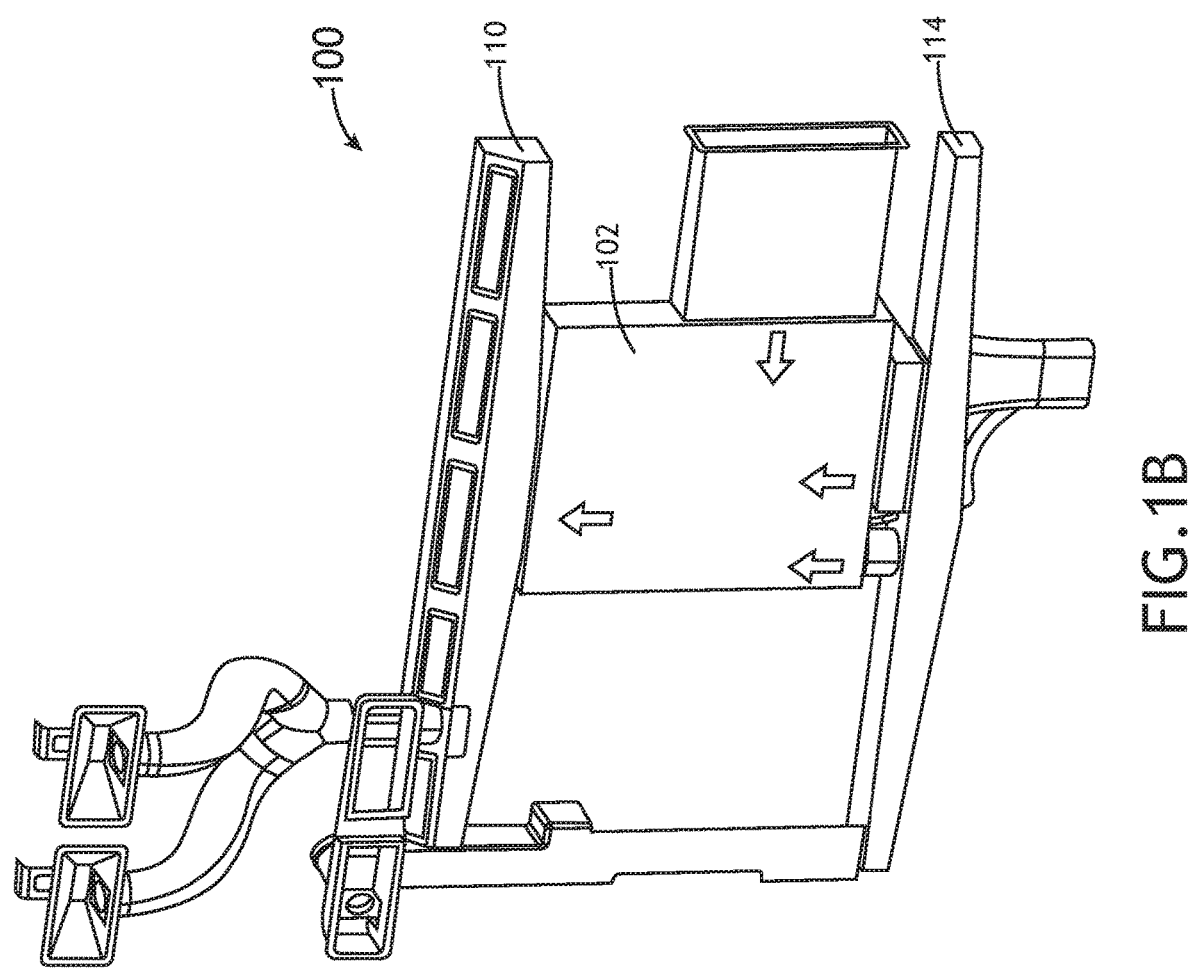
FIG. 1B shows an environmental view of an exemplary embodiment of an air chiller and duct work.

Referring to FIGS. 1A-1B, environmental views of an aircraft galley 100 having an exemplary embodiment of an air chiller 102 are shown. FIG. 1A shows a front view of galley 100 with an air chiller 102 affixed to a back wall. In at least one embodiment, the galley 100 has a service column (extending perpendicular to the view shown) to allow connection of potable and waste water services, electrics etc. The service column is space constrained and therefore traditionally unsuitable for air chillers 102. Chilled upper bays 104 are supplied by one or more chilled air ducts 106, 108 connected to chilled air supply ducts 110. Lower bays 112 may also be supplied via the chilled air supply ducts 110. Chilled air return ducts 114 supply air from the chilled bays 104, 112 to the chiller 102; circulating chilled air may increase chiller 112 efficiency.

Various embodiments of the chiller 102 utilize different technology, therefore standardizing the envelope and connection ports may also be advantageous. Depending on the aircraft type the chiller 102 could be designed to use an aircraft based chilled liquid feed and heat exchanger, a combination solid state thermo-electric and liquid recirculated cooling, or a vapor cycle condenser and evaporator system.

Figure 2:
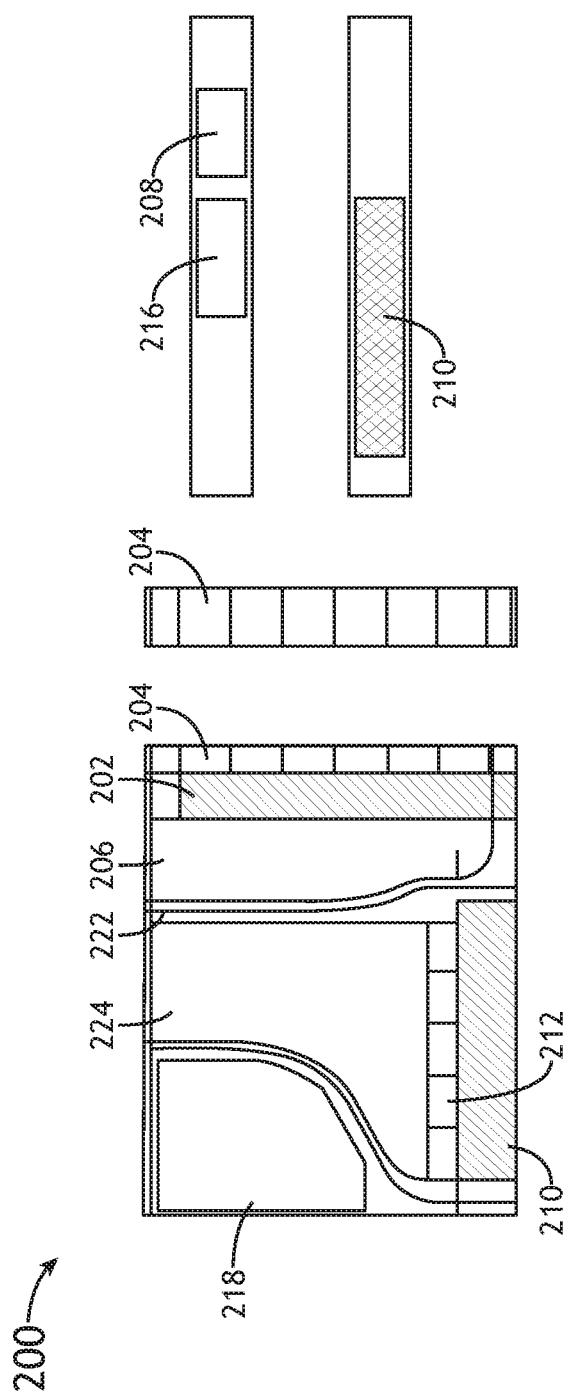
FIG. 2 shows side, front, top, and bottom views of an air chiller according to an exemplary embodiment.

Referring to FIG. 2, side, front, top, and bottom views of an air chiller 200 according to an exemplary embodiment, with a reduced envelope adapted to fit within a service column of a galley. The chiller 200 comprises a condenser 202 (heat exchanger) with a bank of high-pressure condenser fans 204 immediately adjacent, oriented to force air through the condenser 202 and cool an expanded refrigerant gas. The air forced through the condenser 202 enters an exhaust space 206 before being expelled through a condenser exhaust outlet 208 defined by a top surface of the chiller 200. The air from the condenser exhaust outlet 208 may directed to a duct for removal or be expelled into a service space above or below the cabin. In at least one embodiment, the condenser 202 is oriented vertically.

The cooled refrigerant expands within and cools an evaporator 210. The evaporator 210 includes a bank of evaporator fans 212 oriented to draw air from a chilled air return duct, pass it through the evaporator 210 to chill to around −3° C. (26.6° F.), and out a chilled air supply outlet 216 defined by a top surface of the chiller 200. In at least one embodiment, the evaporator 210 is oriented horizontally. The chilled air supply outlet 216 may expel the chilled air directly into cooled bays or may be connected to one or more ancillary conduits that expel the chilled air into the cooled bays. The chiller 200 includes mechanical and electronic components, such as a thermal expansion valve, compressor, receiver drier, controller, etc., disposed in a utility compartment 218.

The condenser 202 and bank of condenser fans 204 are elongated such that the condenser 202 generally corresponds to the shape of a row of condenser fans 204 disposed linearly. Likewise, the evaporator 210 and evaporator fans 212 are elongated such that the evaporator 210 generally corresponds to the shape of a row of evaporator fans 212 disposed linearly. The condenser 202 and evaporator 210 are disposed in a plane such that the entire chiller 200 has a width generally defined by the width of the condenser 202 and/or evaporator 210, which may conform to the available space in service column. Furthermore, the utility compartment 218, and corresponding components, may be sized and oriented to conform to the width of the chiller 200 as defined by the condenser 202 and/or evaporator 210.

Air flow is generally defined by the size and power of the banks of fans 204, 212 and the size of the corresponding ducts. A smaller exhaust space 206 necessitates more powerful fans 204, 212 to maintain the necessary air flow. Fan noise increases with size and power; to conform to desirable cabin noise standards, the exhaust space 206 may have an effective minimum size.

In at least one embodiment, the exhaust space 206 is separated from a chilled air supply space by a layer of insulation 222. The exhaust space 206 and chilled air supply space may be oriented to conform to existing ducts within the service column.

Figure 3:
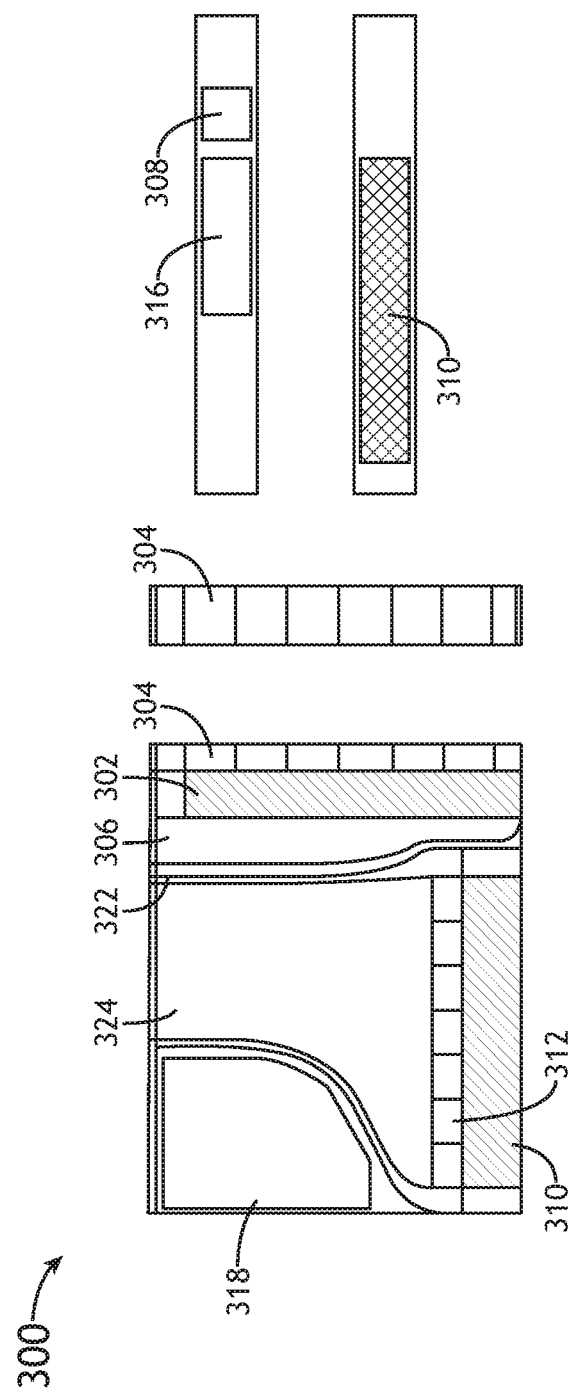
FIG. 3 shows side, front, top, and bottom views of an air chiller according to an exemplary embodiment.

Referring to FIG. 3, side, front, top, and bottom views of an air chiller 300 according to an exemplary embodiment are shown. The chiller 300 comprises a vertical condenser 302 with a bank of adjacent high-pressure condenser fans 304, oriented vertically, to force air through the condenser 302 into an exhaust space 306 before being expelled through a condenser exhaust outlet 308 defined by a top surface of the chiller 300. An evaporator 310 in fluid communication with the condenser 302 is oriented horizontally. The evaporator 310 includes a bank of evaporator fans 312 oriented to draw air from a chilled air return duct, pass it through the evaporator 310 to chill to around −3° C. (26.6° F.), and out a chilled air supply outlet 316 defined by a top surface of the chiller 300. The chiller 300 includes mechanical and electronic components, such as a compressor, receiver, drier, controller, etc., disposed in a utility compartment 318.

The condenser 302 and evaporator 310 are disposed in a plane such that the entire chiller 300 has a width generally defined by the width of the condenser 302 and/or evaporator 310, which may conform to the available space in service column. Furthermore, the utility compartment 318, and corresponding components, may be sized and oriented to conform to the width of the chiller 300 as defined by the condenser 302 and/or evaporator 310.

In at least one embodiment, the exhaust space 306 is separated from a chilled air supply space 324 by a layer of insulation 322. The exhaust space 306 and chilled air supply space 324 may be oriented to conform to existing ducts within the service column. Air flow is generally defined by the size and power of the banks of fans 304, 312 and the size of the corresponding ducts. Where the size of the chiller 300 is defined by the size of the service column, a smaller exhaust space 306 may allow for an enlarged evaporator 310 with an additional evaporator fan 312, and a larger chilled air supply space 324 to increase the surface area of the evaporator 310 and thereby increase chiller efficiency. Such an embodiment may result in higher static back pressure and airflow velocity, and therefore louder noise during operation.

Figure 4:
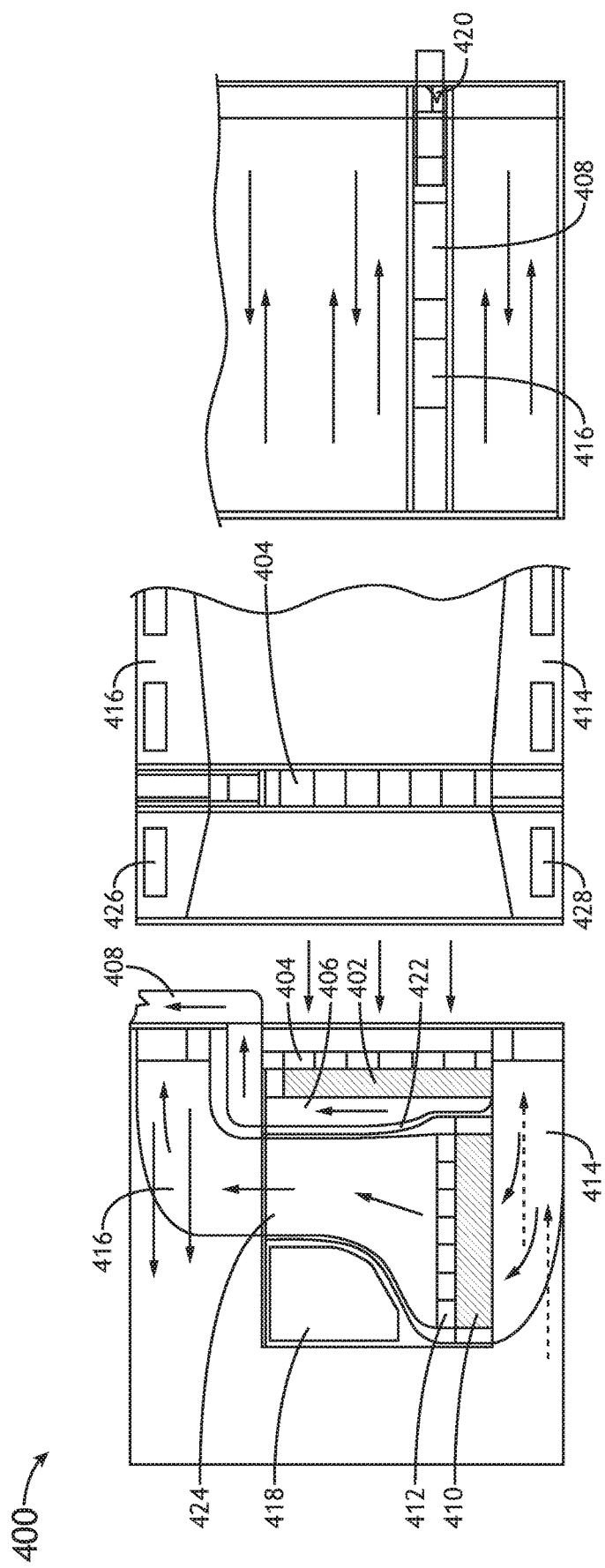
FIG. 4 shows side, front, and top views of an air chiller installed in an aircraft galley service column according to an exemplary embodiment.

Referring to FIG. 4, side, front, and top views of an air chiller 400 installed in a galley service column according to exemplary embodiments are shown. The chiller 400 comprises a vertical condenser 402 with a bank of adjacent high-pressure condenser fans 404, oriented vertically, to force air through the condenser 402 into an exhaust space 406 before being expelled through a condenser exhaust duct 408 connected to a top surface of the chiller 400. In at least one embodiment, air for the condenser 402 is drawn from the cavity behind the galley rather than directly from the passenger cabin. An evaporator 410 in fluid communication with the condenser 402 is oriented horizontally. The evaporator 410 includes a bank of evaporator fans 412 oriented to draw air from a chilled air return duct, pass it through the evaporator 410 to chill to around −3° C. (26.6° F.), and out a chilled air supply duct 416 connected to the top of the chiller 400. The chiller 400 includes mechanical and electronic components disposed in a utility compartment 418.

The condenser 402 and evaporator 410 are disposed in a plane such that the entire chiller 400 has a width generally defined by the width of the condenser 402 and/or evaporator 410, which may conform to the available space in service column. Furthermore, the utility compartment 418, and corresponding components, may be sized and oriented to conform to the width of the chiller 400 as defined by the condenser 402 and/or evaporator 410.

In at least one embodiment, the exhaust space 406 is separated from a chilled air supply space 424 by a layer of insulation 422. The exhaust space 406 and chilled air supply space 424 may be oriented to conform to existing ducts within the service column. In at least one embodiment, one or more of the chilled air return duct 414 and chilled air supply ducts 416 may include a splitter 420 to proportionally divide and control corresponding air flows. The chilled air is distributed via the supply air outlet ports 426 before being re-ingested by the chilled air return ports 428.

Air chillers 400 are generally more difficult to install as compared to liquid chillers due to the ducting necessary to facilitate two separate air cycles. An air chiller 400 according to at least one embodiment, when installed in a service column of an aircraft galley, is oriented with the condenser fans 404 facing into the galley space and the utility compartment 418 distal to the galley space so that the air chiller 400 is generally orthogonal a rear wall of the galley (as is the service column). The chilled air supply duct 416 and condenser exhaust duct 408 generally remain within a space defined by the width of the air chiller 400, with the condenser exhaust duct 408 below the chiller air supply duct 416, at least in proximity to the air chiller 400, so that the condenser exhaust duct 408 and chiller air supply duct 416 also remain within the service column until they tie into corresponding duct work in the galley.

Figure 5:
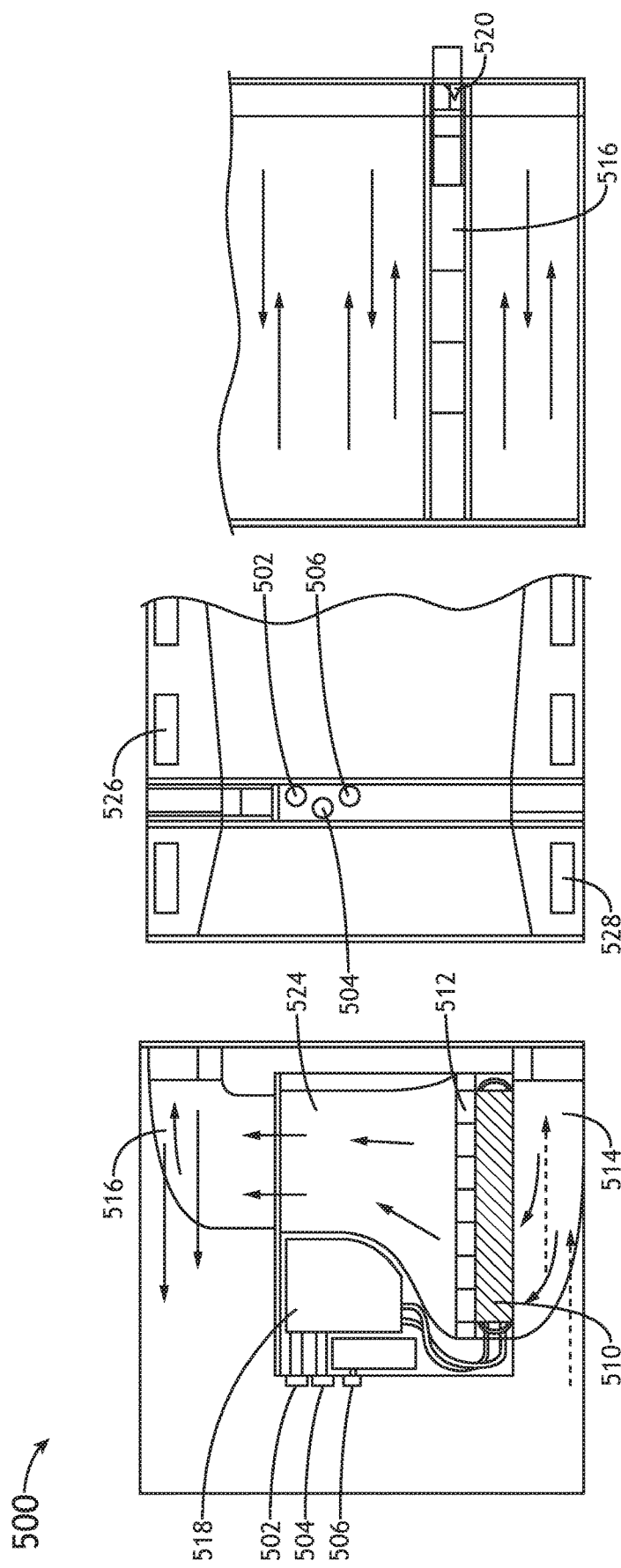
FIG. 5 shows side, front, and top views of a liquid chiller according to an exemplary embodiment.

Referring to FIG. 5, side, front, and top views of liquid chiller 500 according to an exemplary embodiment are shown. The chiller 500 comprises a component in a system where a remote condenser produces a cooled refrigerant. The cooled refrigerant is received via a supply port 502, circulated through an evaporator 510, and returned to the remote condenser via a return port 504. The evaporator 510 includes a bank of evaporator fans 512 oriented to draw air from a chilled air return duct 514, pass it through the evaporator 510 to chill to around −3° C. (26.6° F.) into a chilled air supply space 524, and out a chilled air transfer duct 516 connected to the chilled air outlet on the top of the chiller 500 and the chilled air supply duct that supplies the chilled galley bays. The chiller 500 includes mechanical and electronic components disposed in a utility compartment 518, including temperature and flow sensing modules and electrical inputs and communication ports 506 to control the speed and rotational direction of the fans 512 in line with the operational requirements of the chiller 500.

In at least one embodiment, the supply port 502 and return port 504 may be connected to the remote condenser via flexible hoses or rigid pipes. A single large condenser may supply a plurality of chillers 500; for example, an entire aircraft or a localized section of an aircraft such as defined by a door complex.

In at least one embodiment, one or more of the chilled air return duct 514 and chilled air supply ducts 516 may include a splitter 520 to proportionally divide and control corresponding air flows. The chilled air is distributed via the supply air outlet ports 526 before being re-ingested by the chilled air return ports 528.

A chiller 500 according to such embodiment may eliminate the condenser cycle at the point of use, therefore there is no ingestion of ambient cabin air to locally disrupt the air conditioning system and no hot exhaust to vent into the aircraft's extraction system or into fuselage space.

Figure 6:
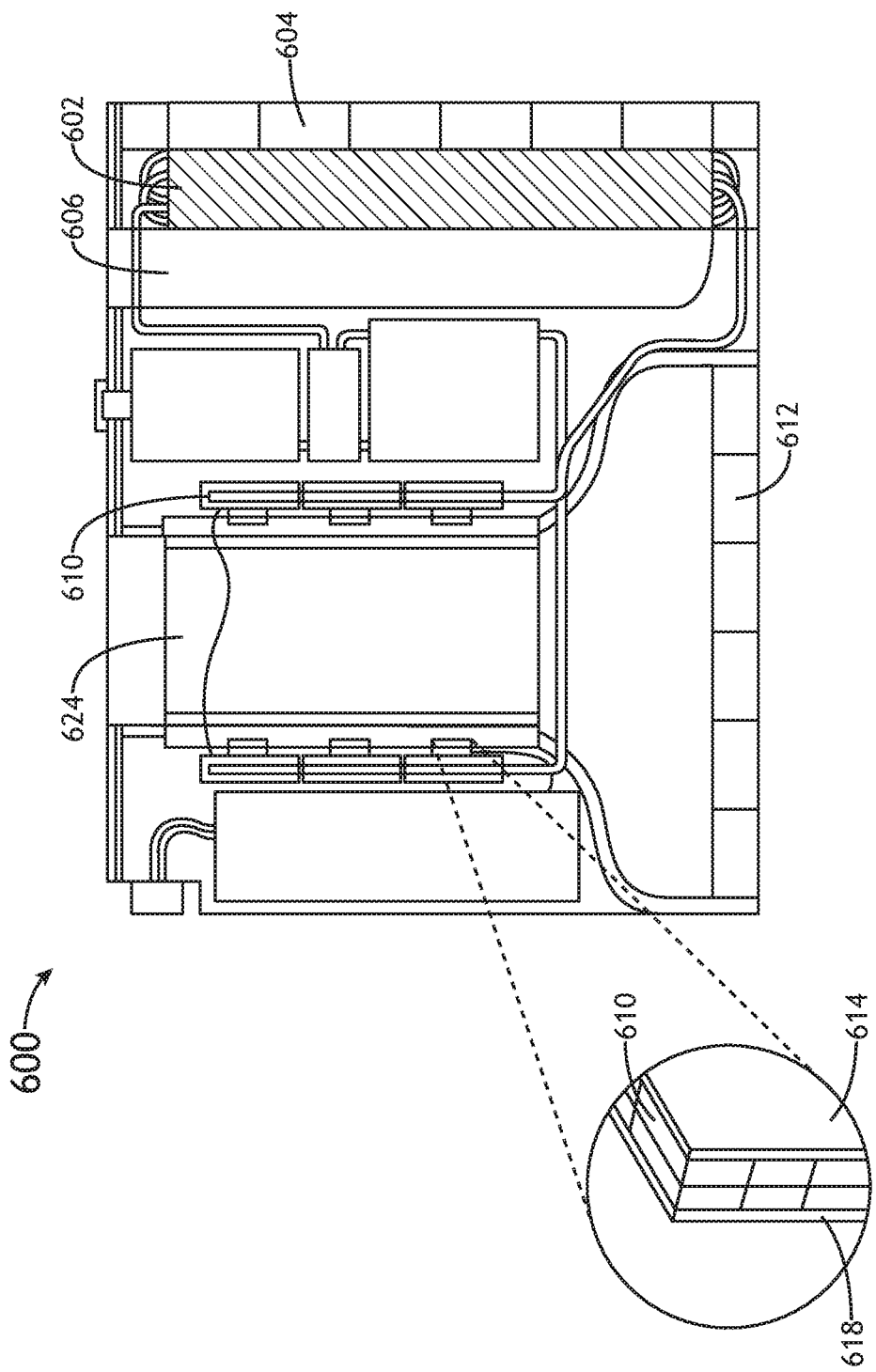
FIG. 6 shows a side view of a hybrid chiller according to an exemplary embodiment.
Figure 7:
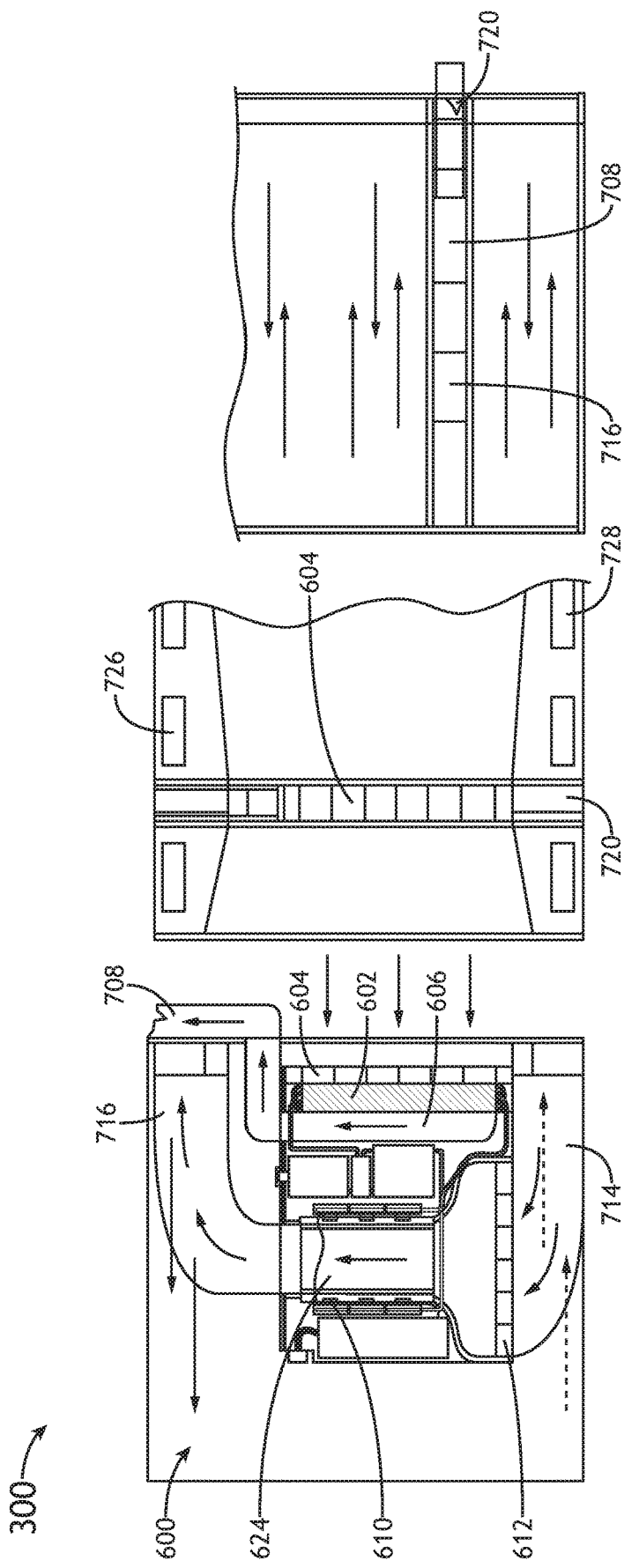
FIG. 7 shows side, front, and top views of a hybrid chiller according to an exemplary embodiment.

Referring to FIGS. 6 and 7, side, front, and top views of a hybrid chiller 600 according to an exemplary embodiment are shown. The chiller 600 comprises a vertical condenser 602 with a bank of adjacent high-pressure condenser fans 604, oriented vertically, to force air through the condenser 602 into an exhaust space 606 before being expelled through a condenser exhaust duct 708 connected to a top surface of the chiller 600. The cooled refrigerant is circulated around a set of thermo-electric cooling elements 610 such as Peltier modules. A bank of cooling fans 612 is oriented to draw air from a chilled air return duct 714 into a chilled air supply space 624 and out a chilled air supply duct 716 connected to the top of the chiller 600. The chilled air supply space 624 is bounded by the thermo-electric cooling elements 610 with a "cold" side 614 abutting the chilled air supply space 624 and a "hot" side 618 abutting the cooled refrigerant, such as through a heat sink. In at least one embodiment, the thermo-electric cooling elements 610 comprise a cold side 614 and hot side 618 of two dissimilar metals in close proximity to form a thermocouple. The cold side 614 and hot side 618 are separated by a thin ceramic plate to form a solid-state heat pump. When an electric current is passed from the cold side 614 to the hot side 618, a temperature differential of as much as 70° C. (158° F.) may be created; as the hot side 618 is cooled, the cold side 614 because colder. Such embodiment may be more efficient than a thermo-electric cooling element 610 using only ambient air temperature for cooling. The addition of a condenser 602 to lower the cold side 614 temperature may reduce electrical power consumption as power consumption by the thermo-electric cooling elements 610 is inverse to the amount of heat the can be pumped.

In at least one embodiment, one or more of the chilled air return duct 714 and chilled air supply ducts 716 may include a splitter 720 to proportionally divide and control corresponding air flows. The chilled air is distributed via the supply air outlet ports 726 before being re-ingested by the chilled air return ports 728.

Figure 8:
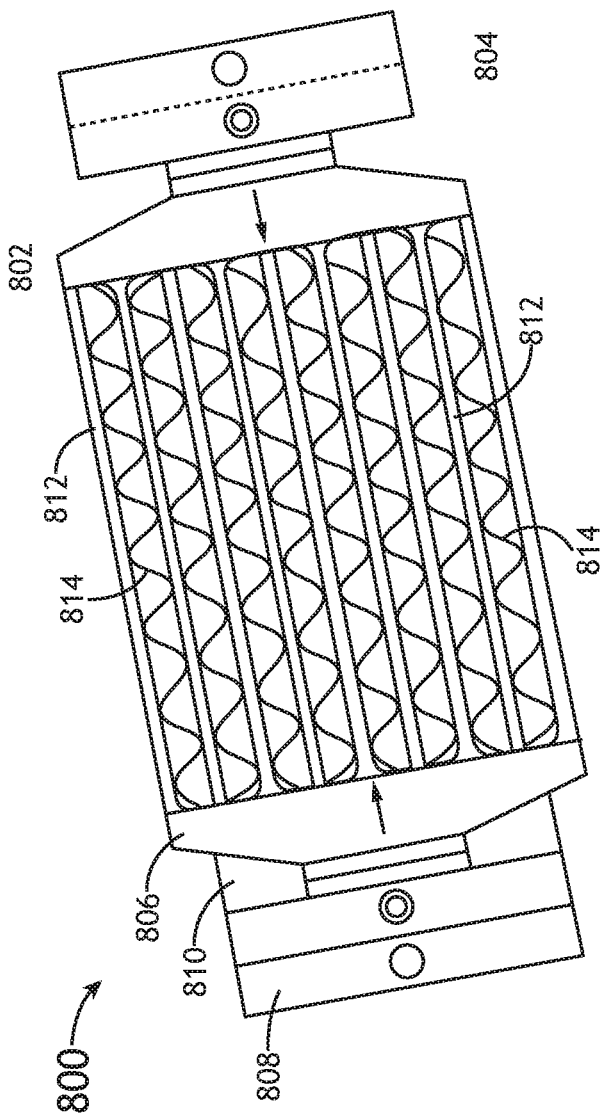
FIG. 8 shows a perspective view of thermo-electric cooling element according to an exemplary embodiment.

Referring to FIG. 8, a perspective view of thermo-electric cooling element 800 according to an exemplary embodiment is shown. The thermo-electric cooling element 800 comprises a hot side 802 and a cold side 804 separated by a ceramic material, configured to form a solid-state heat pump. The cold side 804 may be disposed on a heat sink 806. In at least one embodiment, the heat sink 806 comprises a plurality of heat exchanger ribs 812. Light alloy finning 814 may be interposed between the ribs 812 to further enhance the rate of heat transfer. In at least one embodiment, the finning 814 of proximal heat exchangers may comprise intermeshing pairs.

In at least one embodiment, heat from the hot side 802 is absorbed by a heat transfer fluid such as polyethylene glycol/water mix that passes through a high conductivity heat transfer tank 808 attached to the hot side 802 of individual thermo-electric cooling elements 800. A recirculating pump moves such heat transfer fluid from a condenser, through hot side heat exchangers to a proportioning/recirculation valve, and to the heat transfer tank 808.

In at least one embodiment, the liquid circuit is closed but may be refilled from a reservoir with a removable over pressure venting cap. The cold side 804 of the thermo-electric cooling element 800 is attached to the heat sink 806. The heat sink 806 may comprise a rib and fin heat exchanger.

Figure 9:
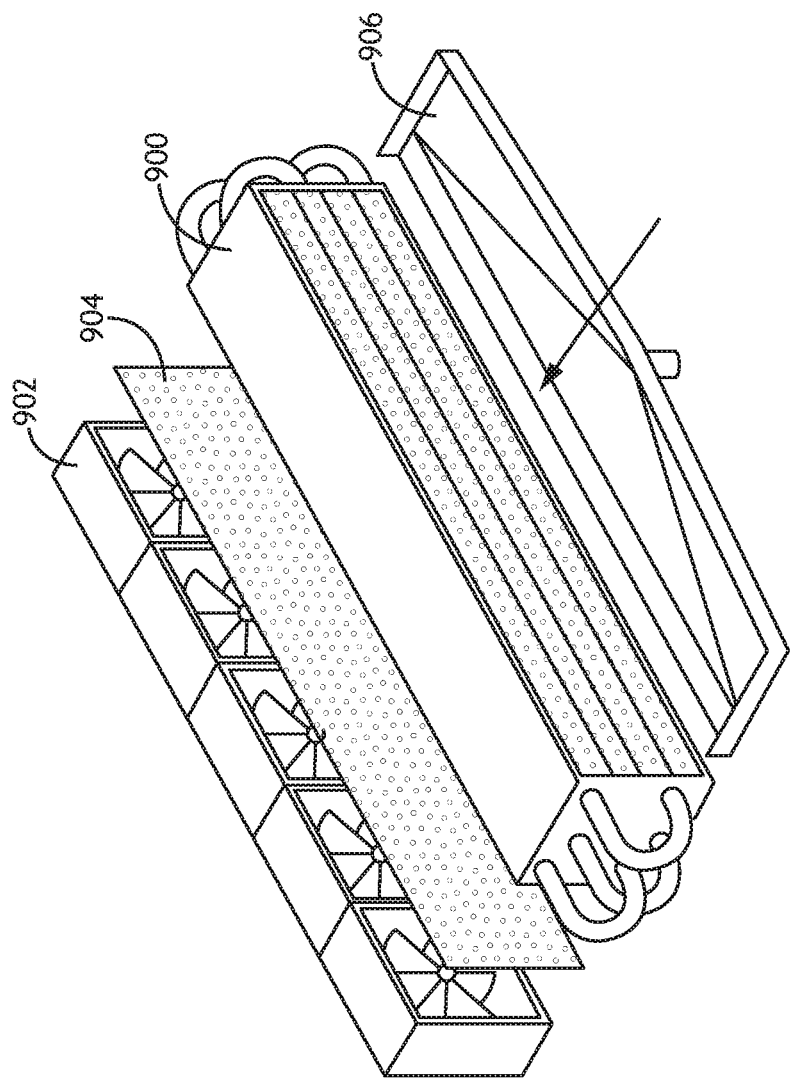
FIG. 9 shows a perspective view of an evaporator assembly according to an exemplary embodiment.

Referring to FIG. 9, a perspective view of an evaporator assembly according to an exemplary embodiment is shown. During normal chiller operation, the evaporator 900 (heat exchanger) can become blocked with ice as the warm moist air in the chilled compartment condenses and freezes as it passes through, eventually resulting in reduced or no airflow. Airflow sensors monitor the chiller's performance until preset parameters are reached, triggering a defrost cycle.

Such preset parameters may include airflow volume, output temperature, time since last defrost cycle, etc. during a defrost cycle, an electrical resistant element 904 is turned on, locally raising the temperature on an upper surface of the evaporator 900. The direction of a bank of evaporator fans 902 is reversed and heated air blown through the evaporator 900, melting the ice and ejecting the water as condensate. Condensate is collected in a drip tray 906 or a suitable collection feature incorporated into the return air duct.

Figure 10:
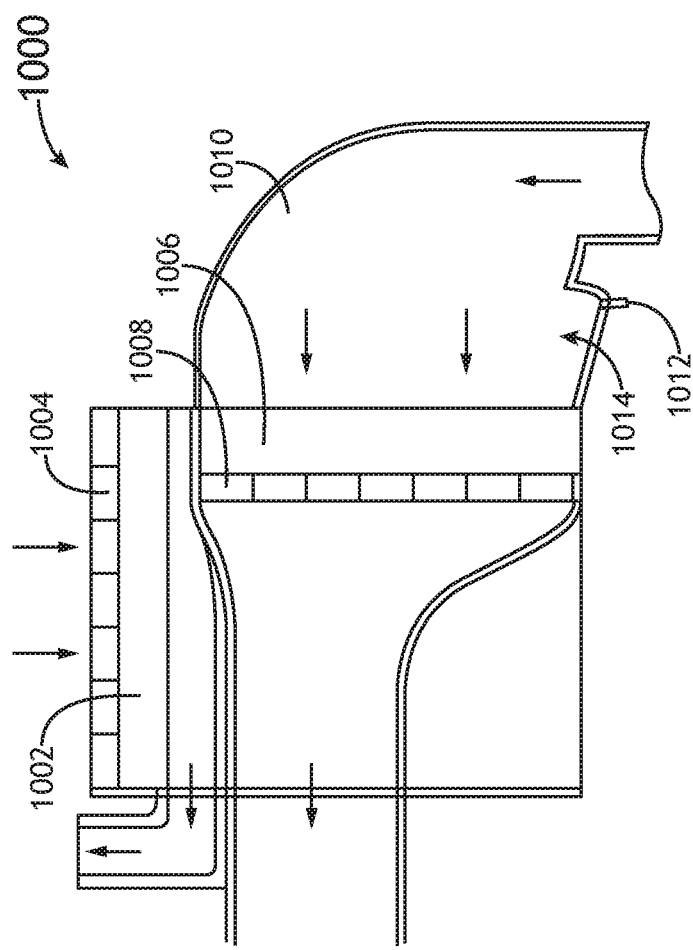
FIG. 10 shows a side view of an air chiller according to an exemplary embodiment.

Referring to FIG. 10, a side view of an air chiller 1000 according to an exemplary embodiment is shown. The chiller 1000 includes a condenser 1002 and corresponding bank of condenser fans 1004 oriented linearly along a first edge of the chiller 1000, and an evaporator 1006 with a corresponding bank of condenser fans 1008 oriented linearly along a second edge of the chiller 1000. The evaporator 1006 may include a heating element to defrost the evaporator 1006 during a defrost cycle. During the defrost cycle, the evaporator fans 1008 operate in reverse to blow heated air through the evaporator 1006 and flush condensate into a chilled air return 1010. The chilled air return 1010 may include a drain 1012 and a condensate collection trough 1014.

In at least one embodiment, the chiller 1000 may lay flat on its side, e.g. on top of a galley or adjacent monument, with variations for the chilled air inlet/outlet on the top and bottom or on the sides of the chiller 1000.

Figure 11:
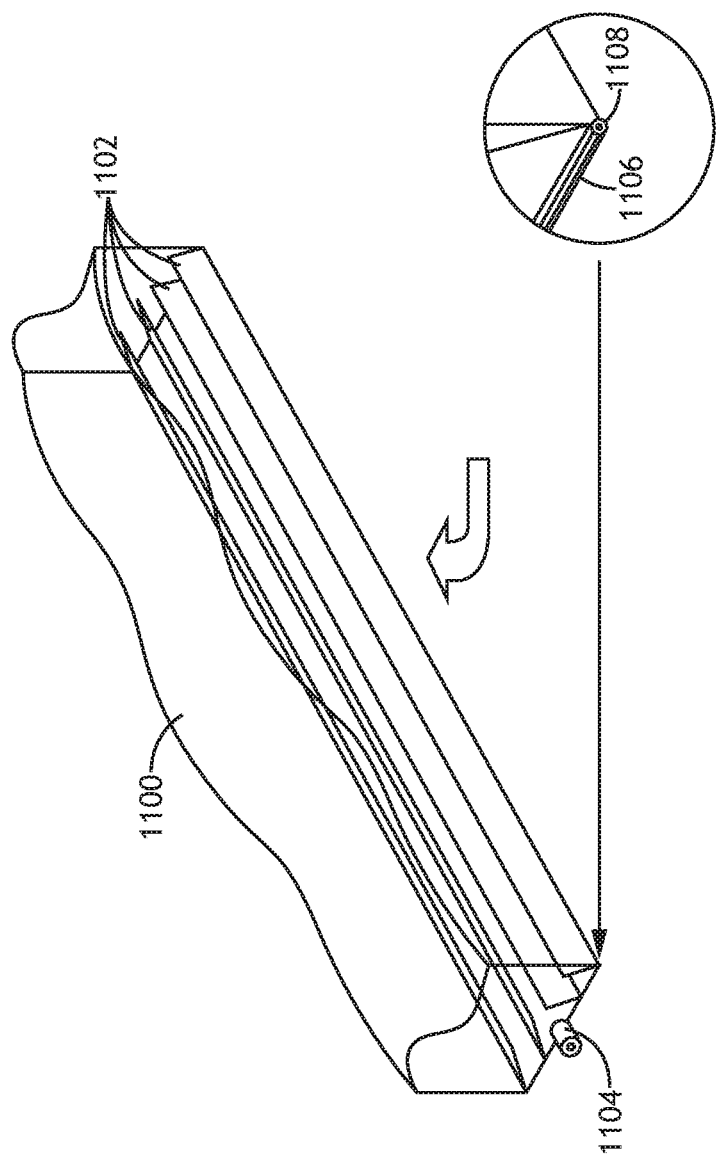
FIG. 11 shows a perspective view of a louvered inlet according to an exemplary embodiment.

Referring to FIG. 11, a perspective view of a louvered inlet according to an exemplary embodiment is shown. Where a chiller 1100 includes mechanisms for defrosting the evaporator, a louvered inlet may be necessary to close off the chilled air return and capture condensate. In at least one embodiment, flaps 1102 are hinged along one edge, configured to open via air pressure during the normal operation. When airflow is reversed during defrost, the flaps 1102 close and seal off the inlet aperture. Closure may be assisted by weights attached to the flaps.

In at least one embodiment, the flaps 1102 are actuated electrically, either by a stepper motor 1104 using a toothed belt 106 with individual sprockets 1108 attached to the hinge of each flap, or via a solenoid using levers and bell cranks. The condensate cannot re-enter the cart bay or compartment, so is forced into a collector at one end of the return air inlet and disposed of into the aircraft's waste water system by a condensate drain hose.

Although some illustrated embodiments show a chiller installed in the service column of a typical centerline galley, it would be possible to install the chiller in any convenient area adjacent too, behind, on top or inside a galley depending on the configuration and position in the aircraft.

A chiller according to the embodiments described herein may have an external envelope to allow installation in areas in or around the galley where the available space is extremely limited. Both the evaporator and condenser utilize a plurality of axial fans that give overall surface coverage and a high airflow and static pressure. Chiller operation may be simplified by use of a proportioning three-way fluid valve, a one-way fluid valve and variable fan speed to control the temperature and air volume output according to heat load removal requirements.

A chiller according to the embodiments described herein may be installed various orientations to allow alternative positions for the condenser ambient/hot exhaust air inlet and outlet, re-circulated chilled compartment air inlet/outlet, and/or heat exchanger inlet/outlet to suit the galley installation requirements. For example, the possible installation positions include a largely vertical (narrow side), or largely horizontal (narrow side) option, and any of the four possible rotational orientations to suit installation requirements with minimal condensate collection modifications.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A chiller comprising:
   a condenser;
   a bank of condenser fans corresponding to the condenser configured to circulate air through the condenser;
   an air-cooling element in fluid communication with the condenser;
   a bank of evaporator fans configured to circulate air through the air-cooling element;
   a cold air supply duct including a splitter configured to proportionally divide cold air outputs;
   a cold air return duct including a splitter configured to proportionally divide cold air returns and defining a condensate trough proximal to an evaporator and a drain; the condensate trough disposed to collect condensate when the chiller is operated in a reverse, defrost mode,
   wherein:
   the condenser and bank of condenser fans are linearly elongated and disposed along a vertical first edge of the chiller;
   the bank of evaporator fans is disposed linearly along a horizontal second edge of the chiller; and
   the disposition of the condenser and bank of condenser fans, and evaporator fans define a chiller envelope configured to fit within a service column of an aircraft.

2. The chiller of claim 1, wherein the air-cooling element comprises an evaporator, and further comprising a heating element corresponding to the evaporator.

3. The chiller of claim 2, further comprising a processor configured to:
   identify one or more parameters for a defrost cycle;
   activate the heating element; and
   reverse the direction of the bank of evaporator fans.

4. The chiller of claim 3, further comprising a louvered inlet disposed on the evaporator, wherein the louvered inlet comprises a plurality of fins configured to close via air pressure from the bank of evaporator fans operating in reverse.

5. The chiller of claim 3, further comprising a louvered inlet disposed on the evaporator, wherein the louvered inlet comprises:
   a plurality of fins; and
   at least one motor configured to close the plurality of fins when the bank of evaporator fans is operating in reverse.

6. The chiller of claim 1, wherein the air-cooling element comprises a plurality of thermo-electric cooling elements disposed around a chilled air space.

7. The chiller of claim 1, wherein the air-cooling element comprises an integral Peltier hot-side cooling system using a recirculated air-cooled liquid.

8. An aircraft galley comprising:
a chiller comprising:
- a condenser;
- a bank of condenser fans corresponding to the condenser configured to circulate air through the condenser;
- an air-cooling element in fluid communication with the condenser;
- a bank of evaporator fans configured to circulate air through the air-cooling element;
- a cold air supply duct including a splitter configured to proportionally divide cold air outputs;
- a cold air return duct including a splitter configured to proportionally divide cold air returns and defining a condensate trough proximal to an evaporator and a drain; the condensate trough disposed to collect condensate when the chiller is operated in a reverse, defrost mode, wherein:
the condenser and bank of condenser fans are linearly elongated and disposed along a vertical first edge of the chiller;
the bank of evaporator fans is disposed linearly along a horizontal second edge of the chiller; and
the disposition of the condenser and bank of condenser fans, and evaporator fans define a chiller envelope configured to fit within a service column of an aircraft.

9. The aircraft galley of claim 8, wherein:
the air-cooling element comprises an evaporator; and
the chiller further comprises a heating element corresponding to the evaporator.

10. The aircraft galley of claim 9, wherein the chiller further comprises a processor configured to:
identify one or more parameters for a defrost cycle;
activate the heating element; and
reverse the direction of the bank of evaporator fans.

11. The aircraft galley of claim 10, wherein the chiller further comprises a louvered inlet disposed on the evaporator, wherein the louvered inlet comprises a plurality of fins configured to close via air pressure from the bank of evaporator fans operating in reverse.

12. The aircraft galley of claim 10, wherein the chiller further comprises a louvered inlet disposed on the evaporator, wherein the louvered inlet comprises:
a plurality of fins; and
at least one motor configured to close the plurality of fins when the bank of evaporator fans is operating in reverse.

13. The aircraft galley of claim 8, wherein the air-cooling element comprises a plurality of thermo-electric cooling elements disposed around a fin and tube heat exchanger.

14. The aircraft galley of claim 8, wherein the air-cooling element comprises a plurality of thermo-electric cooling elements disposed around a fin and tube heat exchanger.

* * * * *